Nov. 30, 1926.
C. C. WHITTAKER
MOTOR CONTROL SYSTEM
Filed March 15, 1922
1,608,826
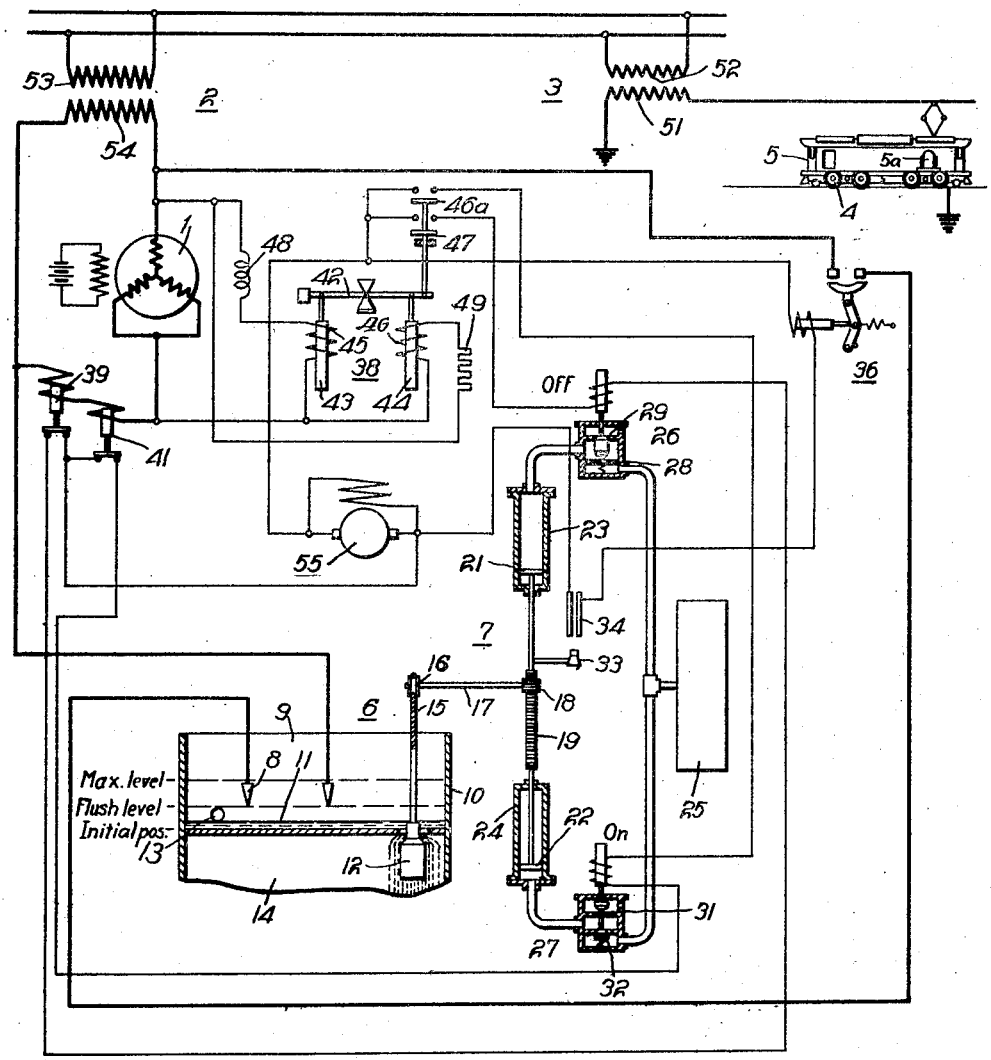
WITNESSES:
H. B. Funk
H. C. Lowe
INVENTOR
Charles C. Whittaker
BY
Wesley G. Carr
ATTORNEY Patented Nov. 30, 1926.

1,608,826

UNITED STATES PATENT OFFICE.

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed March 15, 1922. Serial No. 543,812.

My invention relates to distribution systems and, particularly, to systems that are subjected to comparatively heavy regenerative currents, such, for example, as electrical distribution systems for railway locomotives.

One object of my invention is to provide energy-absorbing means which may be automatically connected to a distribution system to protect the generator and other equipment from excessive speed or current when normal energy-absorbing loads act for periods of time as generators. The energy-absorbing means comprises an artificial load that is connected across the line when the regenerative current of one or more locomotives exceeds the load current drawn from the line.

Another object of my invention is to provide automatic means for varying the resistance device that constitutes a portion of the energy-absorbing means to compensate for the variations in value of a regenerative current.

A further object of my invention is to provide a distribution system that is subjected to regenerative currents with automatic current-controlling devices that will be more simple and rugged in construction and more reliable and effective in operation than any heretofore known to the art.

Briefly speaking, my invention comprises automatically inserting a liquid rheostat in a control system, when the driving motors of a railway locomotive are regenerating current at a frequency above a predetermined value.

For a better understanding of my invention, reference may be made to the accompanying drawing, the single figure of which illustrates a distribution system embodying my invention and comprising a dynamo-electric machine 1, such, for example, as a synchronous generator, and a plurality of transformers 2 and 3, which is adapted to energize a plurality of main driving motors 4 of an electric locomotive 5. The main motors 4 may be considered to be of the usual three-phase induction type. A three-phase converter 5ª is employed for converting single-phase energy into three-phase energy, in accordance with familiar principles.

A liquid rheostat 6, the operation of which is governed by a fluid-pressure engine 7, such, for example, as that illustrated and described in Patent No. 1,374,562, granted to A. J. Hall, dated Apr. 12, 1921, and assigned to the Westinghouse Electric and Manufacturing Company, is employed to absorb excessive regenerative currents. The generator 1, transformer 2 and liquid rheostat 6 are located in a powerhouse or substation (not illustrated). The transformers 2 and 3 comprise the feeder circuit for the motors 4 of the locomotive 5. The liquid rheostat 6 comprises a plurality of electrodes 8, which are rigidly mounted in a compartment 9 of a tank 10. The height of electrolyte 11 is governed by an outlet valve 12 and an inlet port 13. The normal operation of the liquid rheostat is such that the electrolyte flows from the inlet port 13 around the outlet valve 12 into a lower or reservoir compartment 14, and, thence, is circulated through cooling apparatus (not illustrated) and returned through the inlet port 13 to the upper compartment 9 of the liquid rheostat 6.

The valve 12 is operated by means of a rope or cable 15, which is wound around a sheave 16 which, in turn, is secured to a rotatable shaft 17. The shaft 17 may be rotated by means of a pinion 18, mounted thereon, which engages a rack member 19 that constitutes a part of the fluid-pressure engine 7. The rack member 19 is rigidly connected to pistons 21 and 22 which are movably mounted within a plurality of cylinders 23 and 24, respectively.

Fluid under pressure is normally admitted to the cylinder 23 from a source of fluid supply, such, for example, as a reservoir 25, through an "off" valve 26. Fluid under pressure is supplied to the piston 22, which is mounted within the cylinder 24, from the reservoir 25, through an "on" valve 27, only when its actuating coil is energized. The "off" or normally open valve is so constructed that pressure is normally maintained upon the piston 21 through an inlet port 28 of the "off" valve 26, when the actuating coil thereof is de-energized. When the actuating coil of the "off" valve is energized, the valve mechanism is such as to permit the fluid within the cylinder 23 to escape through an outlet or exhaust port 29.

The "on" valve 27 is so constructed that fluid pressure from the reservoir 25 is normally excluded from the cylinder 24, that is, when the actuating coil of the "on" valve is de-energized. A passage from the cylinder 24 is provided through an outlet port 31 of the "on" valve. When the actuating coil of the "on" valve is energized, the outlet port 31 is closed and the inlet port 32 is opened to admit fluid under pressure from the reservoir 25 to the cylinder 24.

Briefly speaking, the operation of the fluid-pressure engine 7 occurs as follows:—

When both the "on" and "off" valve-actuating coils are de-energized, fluid under pressure from the reservoir 25 is supplied to the piston 21 and is released from the piston 22 to actuate or maintain the engine 7 to or in its "off" position, which corresponds to the initial position of the liquid rheostat 6. When both the "off" and "on" valve magnets of the engine 7 are energized, fluid under pressure is supplied to the piston 22 and is released from the piston 21, thereby causing the rack member 19 to be actuated through the several operative positions of the engine.

The engine 7 is provided with a movable contact device 33 that is adapted to engage a plurality of stationary contact members 34 to establish a circuit, which will be hereinafter more fully described, when the engine 7 is brought to a position corresponding to the flush-level or initial operative position of the liquid rheostat 6. One of the electrodes 8 of the liquid rheostat 6 is electrically connected, through a circuit breaker 36, to one terminal of the generator 1, and the other electrode 8 is connected by the actuating coils of a plurality of current relays 39 and 41 to a second terminal of the generator 1.

The operation of the engine 7 and the circuit breaker 36 is governed by a frequency relay 38, which may be of any well-known construction, and by current-limit relays 39 and 41.

The frequency relay 38 comprises a pivotally mounted bar 42 of insulating material that is mechanically connected to a plurality of magnetizable core members 43 and 44, which are magnetized by corresponding actuating coils 45 and 46. A plurality of contact members 46ª and 47 are mechanically connected to the pivotally-mounted bar 42 and are actuated thereby. The actuating coil 45 of the frequency relay 38 is connected through an inductance coil 48 across the terminals of the generator 1, and the actuating coil 46 is correspondingly connected in series relation with a resistor 49.

The inductance coil 48, resistor 49 and the actuating coils 45 and 46 are so designed that the contact members 46ª and 47 of the frequency relay 38 will assume their closed position when the frequency of the current traversing the generator 1 exceeds a predetermined value, which, for the purpose of example, has been taken to be thirty cycles.

For the purpose of illustrating the operation of the control system, the normal frequency of the current traversing the generator 1 will be considered to be twenty-five cycles. The current relay 39 is designed to assume its open position when the current traversing the generator 1 is above normal value. The current-limit relay 41 is designed to assume its open position at a somewhat higher value of current than relay 39 and, for the purposes of illustration, will be considered to be set to open when the current traversing the generator 1 is greater by a hundred amperes than the current required to cause the relay 39 to assume its open position.

It is understood that the generator 1 is driven by a prime mover (not shown) that is provided with a suitable governor (not illustrated) for controlling the energy supplied thereby. If the normal frequency of the alternator is, say, 25 cycles, a decrease in the load current will cause the prime mover to speed up slightly in order to cause the governor to reduce the energy supply. During the regenerative operating conditions, all of the energy would be cut off from the prime mover, and the regulator being then powerless, the set would race with the generator 1 running as a synchronous motor, unless sufficiently large auxiliary energy-absorbing means were put into operation. As the speed of the generator 1 increases, its frequency will increase.

When the electric locomotive 5 is running down a relatively steep grade at a speed above that corresponding to synchronism and its main driving induction motors 4 are regenerating current at a frequency value above the normal frequency of the current traversing the generator 1, the current traversing the circuit comprising the main driving motors 4, phase converter 5ª and secondary winding 51 of the transformer 3 will be of higher frequency than the normal frequency of the generator 1. The current traversing the generator will always have the same frequency as the current traversing the motors 4 as the frequency of the current of the motors 4 is determined by the speed of the generator 1.

If other locomotives are traveling on level or ascending grades, excess regenerative current is absorbed by the driving motors thereof. Otherwise, the current will be returned from the regenerating motors to the power house generator.

If the frequency of this current is greater than the normal frequency of the current generated by the generator 1, there will be a tendency to drive the generator 1 as a synchronous motor. At the instant when the generator 1 is about to change from a generating machine to a motor, the current traversing the actuating coils of the relays 39 and 41 is of relatively small value. If the frequency of the current traversing the generator 1 becomes higher than the normal frequency, which, for the purpose of illustration, has been taken to be twenty-five cycles, the current traversing the inductance coil 48 will be correspondingly diminished, thereby decreasing the energization of the actuating coil 45 of the frequency relay 38.

If the frequency of the distribution system increases to thirty cycles, the relatively increased magnetic pull of the actuating coil 46 will raise the solenoid 44 to its upper position, thereby closing the contact members 46ª and 47. The closure of the contact members 46ª causes the energization of the actuating coil of the "on" valve 27 by a circuit comprising the normally closed contact members of the current relay 41, and an auxiliary direct-current generator 55, which is employed to furnish energy to the control circuits. The closure of the contact members 47 of the frequency relay 38 establishes a circuit comprising the actuating coil of the "off" valve 26, the contact members of the relay 39 and the auxiliary generator 55.

Upon the actuating coils of the "on" and "off" valves 27 and 26, respectively, being simultaneously energized, the engine 7 actuates the valve 12 toward its closed position, as previously explained, thereby causing electrolyte to rise in the compartment 9 of the liquid rheostat 6. At the moment when the electrolyte is at flush level, that is, when just the tips of the electrodes 8 are submerged, the movable contact member 33 of the engine 7 bridges the stationary contact members 34 to effect the energization of the actuating coil of the line switch or circuit-breaker 36.

The closure of the line switch 36 establishes a circuit comprising the electrodes 8 of the liquid rheostat 6, which is in shunt relation to the primary winding 54 of the main transformer 2. The electrolyte in the upper compartment 9 of the liquid rheostat 6 will continue to rise as long as the relays 39 and 41 are in their closed positions or until the frequency relay 38 assumes its open position. The liquid rheostat will thus absorb the excess current generated by the motors 4.

When the current supplied by the generator 1 increases to a sufficient value to effect the opening of the relay 39, the "off" valve will assume its normal position, thereby establishing fluid pressure upon the piston 21 to render the engine stationary.

A decrease in the value of the current regenerated by one or more locomotives 5 will cause the generator 1 to take more of the load, thereby increasing the current traversing the actuating coils of the current relays 39 and 41. Likewise, the heating of the electrolyte in the liquid rheostat 6, will decrease the resistance of the circuit comprising the generator 1 and the liquid rheostat 6, thereby increasing the current traversing the actuating coils of the current relays 39 and 41. When the relay 41 assumes its open position because of a sufficiently heavy current traversing its actuating coil, the actuating coil of the "on" valve 27 of the engine 7 is de-energized, thus causing the engine 7 to move toward its "off" position to partially open the valve 12 of the liquid rheostat 6. When the resistance of the liquid rheostats 6 becomes of sufficient value, the relay 41 will again assume its closed position to stop the further operation of the engine 7 toward its "off" position. The generator is thus caused to supply a current varying between predetermined limits throughout the period of regeneration.

When the electric locomotive 5 ceases to travel at a speed that causes the main driving motors 4 to generate current of a frequency appreciably above that of the normal frequency of the generator 1, the frequency relay 38 will assume its open position, thereby causing the de-energization of the actuating coils of both the "on" and "off" valves 27 and 26, respectively, to thus cause the engine 7 to travel toward its "off" position.

When the engine 7 effects the opening of the valve 12 sufficiently to permit the electrolyte from the tank 9 to fall to the flush level, the movable contact member 33 of the engine 7 will, at the same time, disengage the stationary contacts 34, thereby breaking the circuit comprising the actuating coil of the circuit breaker 36 to thus cause the circuit breaker to assume its open position. It will be noted that this arrangement of circuits causes any arcing that occurs to be located at the contact members of the circuit-breaker 36 at the time when the maximum resistance is connected in the circuit interrupted thereby.

If, while the electrolyte is falling to the flush level of the rheostat 6, one or more locomotives should regenerate current sufficient to remove the load from the generator 1, the current traversing the actuating coils of the relays 39 and 41 will be released sufficiently to permit them to close, thereby causing the engine 7 to so actuate the valve 12 of the liquid rheostat that the depth of electrolyte therein will be increased.

From the above description, it is apparent that I have provided means for absorbing the excess energy traversing the distribution system during the period when one or more electric locomotives are descending a grade at a relatively high speed. Automatic means is also provided for compensating for the changes in the value of the current traversing the distribution system during these periods of regeneration.

While I have illustrated and described the preferred form of control system that embodies my invention, it is possible to employ different types of apparatus and rearrange certain of the circuits without departing from the spirit of my invention. I desire, therefore, to be limited only by the scope of the appended claims.

I claim as my invention:—

1. In an alternating-current system, the combination with a source of power, of a translating device adapted for absorbing and generating electrical energy, an energy-absorbing device means comprising a circuit-interrupter for connecting said last-named device to said source and a frequency relay for governing the movement of said interrupter in accordance with the frequency of the current traversing said system when said translating device is generating energy.

2. In an alternating-current system, the combination with a generator and a dynamo-electric machine adapted to be driven either as a motor or as a generator, of a circuit for connecting said machine to said generator, a resistance device, automatic means for connecting said device to said circuit upon the frequency thereof increasing above a predetermined value when said machine is regenerating, and means for varying said resistance device in accordance with the amount of current traversing said circuit.

3. In an alternating-current system, the combination with a source of energy and a load adapted to regenerate under predetermined conditions, of an energy-absorbing device, a switch for connecting said device to said system, a relay device for governing said switch in accordance with the frequency of said system during the regeneration of current by said load, and means comprising a relay for varying the resistance of said device in accordance with the amount of current traversing said generator.

4. In an alternating-current system, the combination with a source of energy, and a load adapted to regenerate under predetermined conditions, of means for absorbing the excess energy regenerated by said load, automatic means for connecting said energy-absorbing means to said source and automatic means for regulating said energy-absorbing means in accordance with the value of the current generated by said source, said regulating means comprising a plurality of relays having their actuating coils in series relation with said source, one of said relays being adapted to render said regulating means inoperative and the other of said relays in conjunction with said first relay being adapted to render said energy-absorbing means inoperative.

5. In an electrical system of distribution, the combination with a generator and a load device subject, at times, to regenerative operation, of an auxiliary load device, means for connecting said auxiliary load device to said system at such times as are necessary to substantially prevent the motoring operation of said generator, and means for disconnecting said auxiliary load device after the generator-load has increased above a predetermined value.

6. In an electrical system of distribution, the combination with a generator and a load device subject, at times, to regenerative operation, of an auxiliary load device, means for connecting said auxiliary load device to said system at such times as are necessary to substantially prevent the motoring operation of said generator, and means for varying said auxiliary load in such manner as to cause the generator to generate a current having a value substantially between certain predetermined limits.

7. In an electrical system of distribution, the combination with a generator, and a load device subject, at times, to regenerative operation, of an auxiliary load device, means for connecting said auxiliary load device to said system at such times as are necessary to substantially prevent the motoring operation of said generator, means for varying said auxiliary load in such manner as to cause the generator to generate a current having a value substantially between certain predetermined limits during said regenerative operation, and means for disconnecting said auxiliary load device after the generator-load has increased above a certain higher predetermined value.

8. In an alternating-current system of distribution, the combination with a synchronous generator and a device normally operative as a load but at times operating to generate alternating-current energy at a frequency controlled by said synchronous generator, of means for substantially preventing the operation of said generator as a motor during the periods when said load device operates to generate currents.

9. In a method of operating an electric generator in conjunction with a device normally operative as a load but at times operative as a source of electric energy, the steps of connecting an auxiliary load device to said generator at such times as are necessary to substantially prevent the motoring operation of said generator, and disconnecting said auxiliary load device after the generator-load has increased above a predetermined value.

10. In a method of operating an electric generator in conjunction with a device normally operative as a load but at times operative as a source of electric energy, the steps of connecting an auxiliary load device to said generator at such times as are necessary to substantially prevent the motoring operation of said generator, and varying said auxiliary load in such manner as to cause the generator to generate a current having a value substantially between certain predetermined limits.

11. In a method of operating an electric generator in conjunction with a device normally operative as a load but at times operative as a source of electric energy, the steps of connecting an auxiliary load device to said generator at such times as are necessary to substantially prevent the motoring operation of said generator, varying said auxiliary load in such manner as to cause the generator to generate a current having a value substantially between certain predetermined limits, during the periods when said first-mentioned device is operative as a source, and disconnecting said auxiliary load device after the generator-load has increased above a certain higher predetermined value.

12. In a method of operating a substantially constant-speed synchronous generator in conjunction with a device normally operative as a load but at times operating to generate alternating-current energy at a frequency controlled by said synchronous generator, the step of adding an auxiliary load device to said generator in order to substantially prevent the motoring operation of said generator during the times when said first-mentioned device operates to generate currents.

13. In an electrical system of distribution, the combination with a generator and a load device subject, at times, to regenerative operation, of a variable auxiliary load device connected across said system, controlling mechanism therefor, means for actuating said controlling mechanism in a direction to reduce the auxiliary load when the generator-load exceeds a predetermined current, and means for actuating said controlling mechanism in a direction to increase the auxiliary load when the generator-load falls below a certain predetermined value.

14. In an electrical system of distribution, the combination with a generator and a load device subject, at times, to regenerative operation, of a variable auxiliary load device connected across said system, controlling mechanism therefor, means for actuating said controlling mechanism in a direction to insert and increase the auxiliary load when the generator-load falls below a predetermined minimum value, means for causing said variable auxiliary load device to remain at a substantially constant adjustment when the generator-load has a value between said minimum value and a certain higher predetermined value, and means for actuating said controlling mechanism in a direction to reduce and remove the auxiliary load when the generator-load exceeds said higher predetermined value.

In testimony whereof, I have hereunto subscribed my name this 10th day of March 1922.

CHARLES C. WHITTAKER.